Oct. 1, 1940.  F. J. SPANG  2,216,462

METHOD AND APPARATUS FOR DIE FORGING DRILL BITS

Filed Feb. 25, 1937  3 Sheets-Sheet 1

INVENTOR
Ferdinand J. Spang
By Green & McCallister
His Attorneys

INVENTOR
Ferdinand J. Spang
By Green & McCallister
His Attorneys

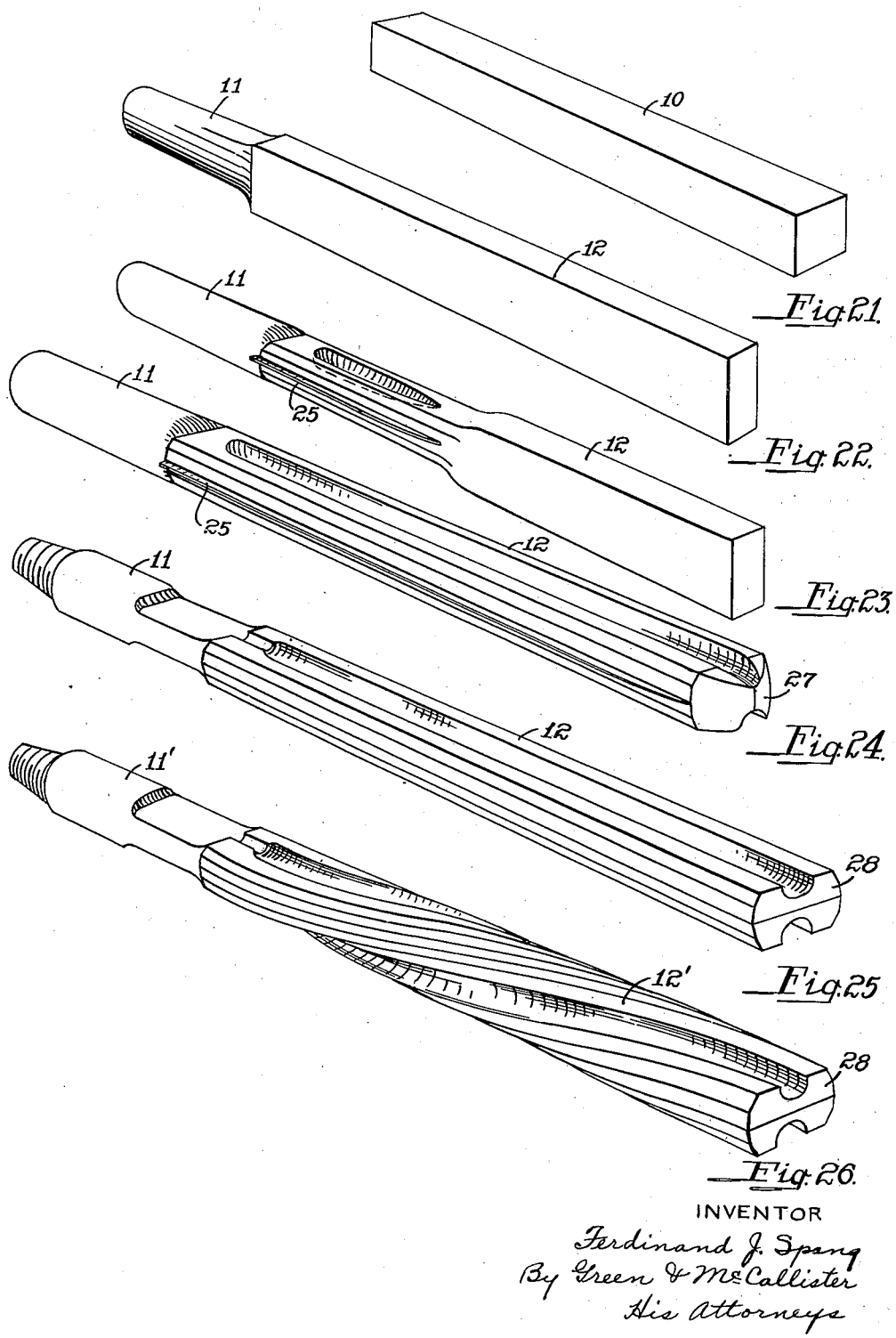

Patented Oct. 1, 1940

2,216,462

UNITED STATES PATENT OFFICE 2,216,462

METHOD AND APPARATUS FOR DIE FORGING DRILL BITS

Ferdinand J. Spang, Butler, Pa.

Application February 25, 1937, Serial No. 127,689

8 Claims. (Cl. 76—95)

This invention relates to the manufacture of steel well drilling bits and more particularly to a method and apparatus for draw-die forging drill bits of the type used in cable tool or percussion drilling.

A cable tool bit generally comprises a shank, adapted to be attached to a stem forming a part of the drill string, and a blade or drilling end of general octagon shape. The blade or drill end of the bit is of such shape that it approximates a block letter H in section, and the sides or legs of the H which are of slightly convex shape on their outer surfaces are connected together by a relatively thin concave bridge wall which defines water courses on opposite sides thereof and between the sides or legs of the bit. All parts of the bit, that is the sides and water course of the blade and the shank, are forged in one piece, and these forgings vary in weight from approximately 200 pounds for a small bit of a few inches in diameter to approximately 4000 pounds for a bit of eighteen inches in diameter, and the weight increases in proportion for bits of still larger sizes.

To the best of my knowledge and belief, cable tool or percussion drill bits have always been manually forged heretofore. This old process, which was necessarily slow and cumbersome due to the weight of the article being forged, consists in taking that portion of a billet of steel sufficient in weight to make the blade of the bit, and forging it into a blank of rectangular section. Water courses are next formed in the blank by simultaneously driving a pair of relatively short convex shaped fullers into opposite faces of the blank. At the start of the fullering operation, a convex shaped fuller or form of small sectional size is placed across an anvil and the blank is manually held thereon by the blacksmith with its major sectional axis in vertical position. Another convex shaped fuller or form of the same sectional size as that on the anvil is then manually held by a helper on the opposite face of the blank from the fuller on the anvil, and the two fullers are driven into the blade by a forging hammer striking the upper fuller. These fullers are relatively short in length in comparison with the length of the blade, and, consequently, only a small portion of the water course is forged at one time. To complete the formation of the water course for the entire length of the bit, the blank is stepped gradually, in a lengthwise direction, across the fuller on the anvil while the top fuller is held manually in a matched location above it. Both are hammer driven into the blade at each successive step of movement. After these small fullers have been driven into the blank for the full length thereof, a second set of fullers of slightly larger section are driven into the blank, step by step through the entire length thereof, and this process is repeated with a series of progressively larger sized fullers until a water course of the desired depth and width is developed in the blank.

The repeated fullering of the blank tends to increase the width of the blank considerably, and after the water course is completed, and the sides of the bit adjacent the water course edged, the blank is rotated 90° and the back of the bit is smoothed to size, which results in a slight closing in of the water course. At the completion of this stage in the manufacture, the blank, with the water courses formed therein, is still substantially rectangular in shape, and to provide an octagon section, the blank is turned 45° so that one corner of the blade rests on the anvil with the diagonal corner in position to be struck by the hammer. The blank is manually held in this position and forged. The blank is then turned 90° and forged to flatten the remaining diagonal corners and produce a sectional shape somewhat resembling an octagon. Each of these corner forging operations tend to further close the water course in addition to the closing thereof by the side sizing operation. After all corners of the blank have been forged, the blade is completed by sizing the water courses with finishing fullers and then re-sizing each of the eight sides of the blade.

Obviously, because of the hand work, the manual holding of the blank on the anvil, and the size and weight of the forging, this process was not only slow and cumbersome but the relative perfection of the product depended entirely upon the skill of the operator. With the hand controlled forging method of making drill bits it was impossible to secure a uniform blend between the bridge walls and between the blade and the shank of the bit due to inability of the operators to properly position and hold the billet and the progressively larger sectional fuller blocks thereon. As a result, laps or cold shuts and other dangerous irregularities frequently developed in the various parts of the bit which were so serious as to cause premature failure of the bit. This was especially the case in the concave sections of the bridge wall adjacent the shank of the bit. In addition, considerable injury to the steel often resulted from the repeated spreading and closing of the water course due to the successive steps of fullering and sizing the various sections, and it was not uncommon to find that lengthwise cracks had developed in the bridge wall as a result of such action. Further, it is also apparent that the location of the fullers on the blank during the formation of the water course could not be uniformly accurate, since the human factor made it a practical impossibility to place the fullers in the exact required location each time. Consequently, the sides of the bit as well as the bridge wall varied in cross section and location and the weight was, therefore, unevenly distributed throughout the length of the bit, causing irregular stresses and wearing conditions with frequent failures during the drilling operation.

It is an object of the present invention to provide a method of draw-die forging cable tool or percussion drill bits in which the blade portion will have a uniform cross-section at any point through the length of the blade and in which the metal will be evenly distributed between the legs and the bridge wall connecting such legs.

Another object of this invention is to provide a method of draw-die forging cable tool or percussion drill bits in which the junction of the blade section and the shank section may be uniformly blended into each other without encountering manufacturing defects frequently found in the hand forged products, and thus avoid the danger of premature failure at this point.

A further object of the present invention is to provide a method of die forging cable tool or percussion drill bits in which the metal of the blank is caused to flow longitudinally of the blank to produce a uniform fiber structure which is substantially lengthwise of the blade.

A still further object is to provide a method of forging cable tool or percussion drill bits wherein the bit is forged in such a manner as to fully preserve the soundness of the raw material in the finished product.

A still further object is to provide a method of forging cable tool bits which progressively compresses and extrudes the steel to form the web or bridge wall thereof.

A still further object is to provide a method and apparatus for forging cable tool or percussion drill bits which is convenient, simple, and more economical than the methods heretofore used in the manufacture of such bits.

These and other objects, which will hereinafter be made apparent to those skilled in this particular art, are accomplished by means of this invention, one embodiment of which is described in the following specification and illustrated in the accompanying drawings wherein:

Fig. 21 is a perspective view of a billet from which the bit is to be forged;

Fig. 22 is a perspective view of the blanked billet;

Fig. 23 is a perspective view of the blank after the first die forging operation has been performed thereon;

Fig. 24 is a perspective view of the blank at the completion of the die forging operations;

Fig. 25 is a perspective view of a finished drill bit; and

Fig. 26 is a perspective view of another type of twisted style bit.

Figure 1:
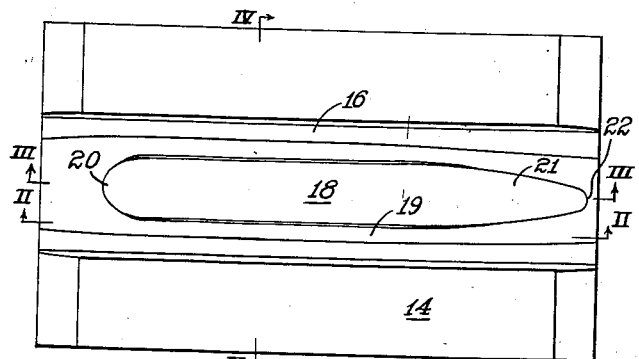
Figure 1 is a plan view of one of the dies used in carrying out my invention, and since each of the dies are exactly the same only one die has been illustrated.
Figure 4:
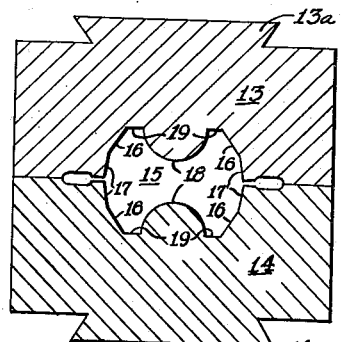
Fig. 4 is a sectional view taken on line IV—IV of Fig. 1 and shows the contour of the dies.
Figure 2:
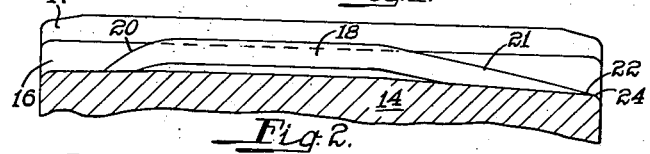
Fig. 2 is a section taken on line II—II of Fig. 1 and having a portion thereof broken away for convenience of illustration.
Figure 5:
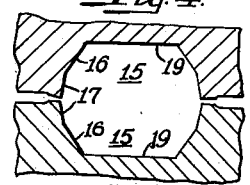
Fig. 5 is a section taken on line V—V of Fig. 3.
Figure 3:
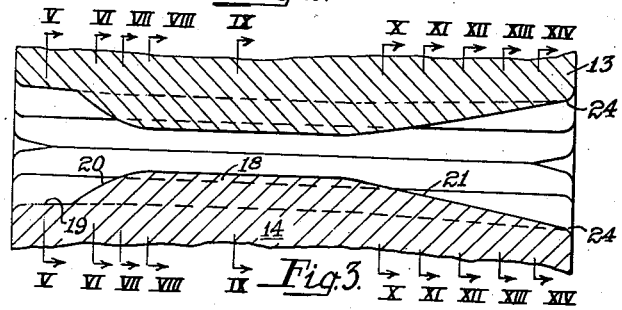
Fig. 3 is a longitudinal section taken on line III—III of Fig. 1 and showing the relative position of the upper and lower dies in their closed position.
Figure 6:
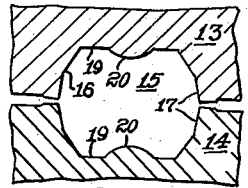
Fig. 6 is a section taken on line VI—VI of Fig. 3, and shows the shape and radius of the fuller at the front end of the dies.
Figure 7:
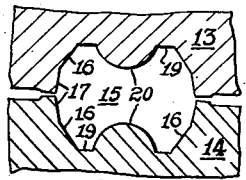
Fig. 7 is a section taken on line VII—VII of Fig. 3 and shows the shape and radius of the fuller at the front end of the die.
Figure 8:
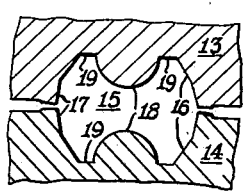
Fig. 8 is a view similar to Fig. 7 taken on line VIII—VIII of Fig. 3.
Figure 9:
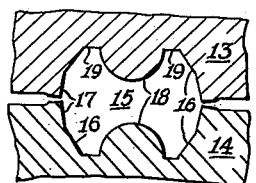
Fig. 9 is a section taken on line IX—IX of Fig. 3.
Figure 10:
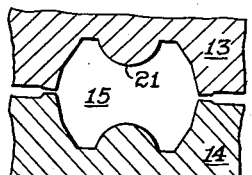
Fig. 10 is a section taken on line X—X of Fig. 3 and shows the beginning of the taper of the fuller at the rear end of the dies.
Figure 11:
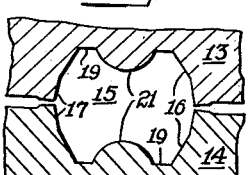
Fig. 11 is a section similar to Fig. 10 taken on line XI—XI of Fig. 3.
Figure 12:
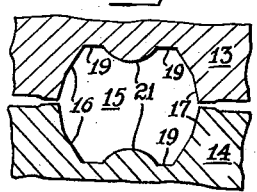
Fig. 12 is a section taken on line XII—XII of Fig. 3.
Figure 13:
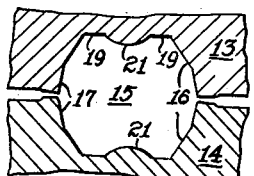
Fig. 13 is a section taken on line XIII—XIII of Fig. 3.
Figure 14:
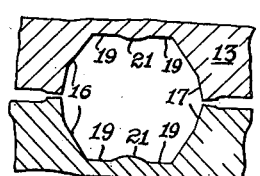
Fig. 14 is a section taken on line XIV—XIV of Fig. 3.

In carrying out my present invention, a steel billet 10 (Fig. 21), substantially square in section and of sufficient gross weight to make the bit desired, is forged at one end into a substantially round section, 11 (Fig. 22)—from which the shank and wrench flat sections of the bit are later to be formed—and the remaining portion is forged into a rectangular shaped section 12 and from which the blade is to be forged. After the formation of the round and rectangular sections 11 and 12, the blank is heated to the desired working temperature and is then positioned between die blocks 13 and 14, having dove-tailed sections 13a and 14a by means of which they are attached to the parts of a suitable pneumatic hammer. Each of the blocks 13 and 14 are relatively long and are exactly alike in shape and size and each has a die cavity 15 therein, the side walls of which are beveled on two different angles as at 16 and 17 to shape the sides of the bit. A portion of each of the cavities 15 is partially filed by a rounded form or fuller 18 which projects from the wall 19 of the die and is adapted to form the water courses in the blank. The front end 20 of each form or fuller 18 is rounded off rather abruptly to form a proper junction between the water courses of the blade of the bit and the shank portion thereof, and the opposite or rear end 21 of the fuller 18 is tapered and extends to a vanishing point 22. All portions of the form or fuller 18 are formed on substantially the same radius, and as a result the front end 20 of the form is sphere-like in shape, and the tapered end 21 thereof tapers in all directions longitudinally until it merges with the face 19.

In order to avoid the possibility of the formation of laps or cold shuts because of excessive working of the blank, the wall 19 of each die is inclined inwardly or away from the face of the die from a point intermediate its ends and toward the rear end of the die. With such an arrangement the walls 19 of the opposed dies 13 and 14 are in effect flared at the rear end of the dies to form an opening 24 between the dies which admits the blade portion of the blank without subjecting it to any working.

Figure 15:
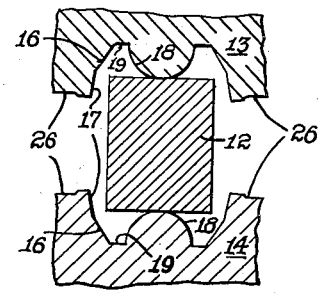
Fig. 15 is a view in section taken on line IX—IX of Fig. 3 showing the relative position of the dies with the blank therebetween at the beginning of the forging operation.
Figure 16:
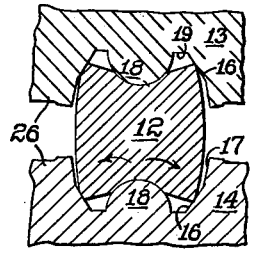
Fig. 16 is a section taken on line IX—IX of Fig. 3 and shows how the blank is deformed on the first forging operation.
Figure 17:
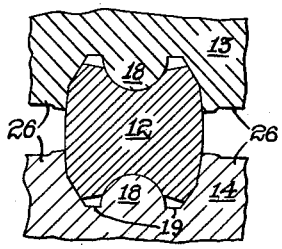
Fig. 17 is a figure similar to Figs. 15 and 16 and shows still further the deforming action of the dies on the blank.
Figure 18:
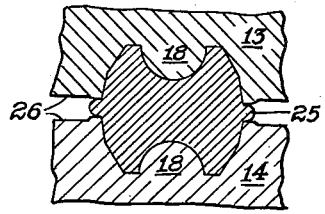
Fig. 18 is a sectional view taken on line IX—IX of Fig. 3 and illustrates the deforming of the blank as the dies approach their closed position.
Figure 19:
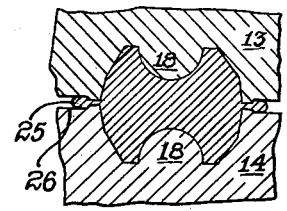
Fig. 19 is a section view taken on line IX—IX of Fig. 3 with the dies completely closed.
Figure 20:
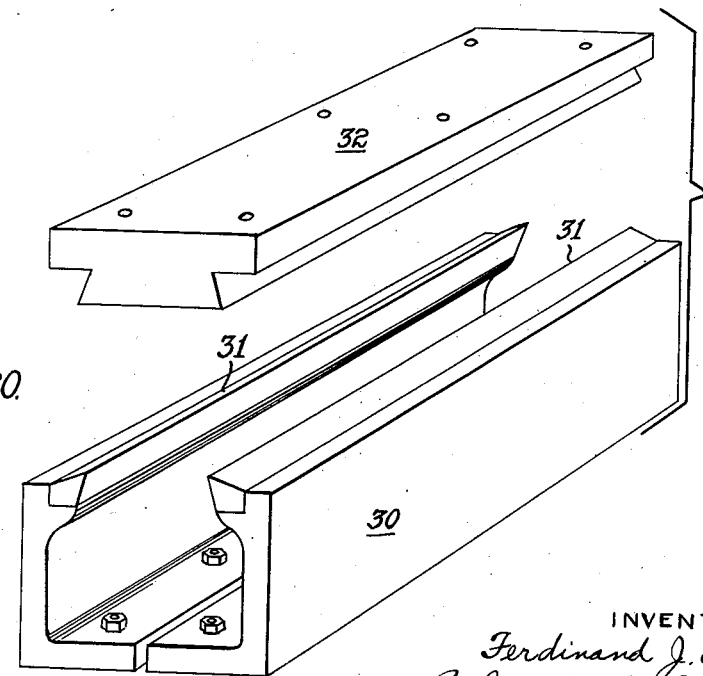
Fig. 20 is a perspective view of a device for shearing the flash or fin from the sides of the bit.

At the beginning of the forging operation the rectangular blank portion 12 is positioned between the opened dies 13 and 14, with its major sectional axis extending vertically (Fig. 15) and with the rounded end 11 close to the front end of the dies, so that the excess portion of the blank projects beyond the rear end of the dies. In order that the dies will be completely filled with metal during the forging operation, I start with a blank having a rectangular portion 12 of cross sectional area substantially greater than the cross sectional area of the combined cavities 15 of the dies 13 and 14, and I prefer to use a blank in which the rectangular portion has a cross sectional area approximately 33% greater than the cross sectional area of the die cavity. With the blank portion 12 in the position described, the hammer is then operated and the upper die block is moved up and down to strike repeated blows on the blank portion 12 until the dies come together as shown in Figure 19 and a section of blade having a perfect water course as long as the full sized portion of the water course forming fuller 18 has been formed therein. As is clearly shown in Figs. 15 to 19, inclusive, the first blow of the upper die on the blank causes the fullers or forms 18 of each die to be driven partially into the blank 12, with the result that the top and bottom faces are slightly concaved and the blank flattened to such an extent that the corners thereof come in contact with the surfaces 16 of the dies. As repeated blows are struck, the sides of the blank are bulged out and metal is moved into contact with the surfaces 17 of each of the dies 13 and 14, whereby the corners are deformed and partially shaped, and since the fuller or forms 18 are driven into the top and bottom of the blank respectively, metal is caused to flow outward into contact with the surfaces 19 of the dies. Due to the fact that the blank portion 12 has a cross sectional area greater than the die cavity 15 and, consequently, contains more metal than can be confined within the closed die cavities 15, it is apparent that as the dies approach closer and closer together the excess metal in the blank must flow longitudinally from the shank end toward the cutting end of the blade with a small portion of metal overflowing to form a seal between the dies in the form of flash 25 thus confining the major portion of the metal within the die cavity. The flash is collected in overflow pockets 26 on adjacent faces of the dies 13 and 14.

After the dies have been brought to the position shown in Fig. 19, the bit is stepped back so that the partially formed portion of the water course which has been acted upon by the tapered end 21 of the fuller or forms 18 is positioned adjacent the front end of the fuller 18. The dies are repeatedly brought together again until the second section of the bit has been completely formed in the manner heretofore described. After this has been done, the bit is again stepped back and the above operations are repeated in the order described until the full length of the blank 12 has been subjected to the action of the dies 13 and 14.

Due to the fact that the metal is confined in the dies before the bit is completely formed, a longitudinal flow of metal takes place from the shank end of the bit toward the cutting end of the bit as well as the transverse or bulging flow heretofore described, and I have found that the finished bit is about 30% longer than the blank from which it was made. Since the bridge wall is thinner than the sides of the bit, it is apparent that the greatest reduction and, consequently, the greatest extrusion occurs in the center of the blank, and as a result the center is extruded a considerable extent beyond the sides of the bit as is clearly shown at 27 (Fig. 24).

It will also be apparent that in the first step of the forging operation, the fibers of the steel will be closed to their final position between the straight portions of the two fuller parts 18 and that they will be only progressively closed along the tapered portions 21 thereof. Thus, in each successive step no abrupt flow line changes will take place when this tapered portion of the blade water course is subsequently fully compressed or lengthwise extended.

After the bit has been completely forged in the dies it is removed therefrom and placed on a box 30 having parallel trimming knives 31 adjacent the upper edges thereof which are spaced apart a distance substantially equal to the width of the blade. With the blade in this position, a pusher block 32 is moved into contact with the upper face of the blade and which presses the blade between the trimming knives and shears the flash 25 therefrom. After the flash has been sheared from the blade, the blank is reversed and the end 11 is worked to form the shank and wrench flats in the usual manner. The selvage 27 on the blade (Fig. 24) is cut off to form a face 28 on the completed blade as shown in Fig. 25.

If it is desired to make a twisted style blade as shown in Fig. 26, the blank having the water course formed therein is reheated and repositioned in the dies with the cutting end thereof held stationary between the dies. While the blade is in this position, the shank end is turned through an arc of any desired degree, twisting the blade to the proper form.

From the foregoing description of my invention it is apparent that the metal in a blade made in accordance with my invention will be evenly distributed through the side walls and water course of the bit. In other words, the sides of the blade will be of uniform shape, thickness, and location through the entire length of the blade and the bridge wall will be also of uniform thickness, width and location. Consequently, the weight will be evenly distributed and the metal in the bit will wear evenly during the drilling operation and it will be free from stresses arising from mass irregularities.

Further, as the result of using a fuller block of the same size and radius as the completed water course, there is less danger of laps or cold shuts developing in the blade during the working thereof, and the weaknesses encountered in blades, made by the old method of manufacture, at the junction of the water course and the shank of the blade will be substantially eliminated.

In my improved die forging process there is no spreading and closing of the water course during the manufacture of the bit, and as a result the probability of seams or cracks appearing in the bridge wall is almost entirely eliminated.

Another important feature of my improved process of manufacture resides in the improved grain structure which is obtained by my die forging operation over the old hand forging process. I have found that my die forging process gives rise to an unusually uniform and evenly distributed grain structure and that the fiber and flow lines extend consistently in a longitudinal direction, that they closely follow the general contour of the bit, and are substantially parallel to the major axis thereof.

In other words, the fibers are not interrupted or broken by my die forging process, but are merely compressed and lengthened into substantially parallel lines running longitudinally of the bit clearly indicating that the reduction of the sectional area of the billet and the contour forming thereof have been beneficial and not destructive of its quality.

What I claim is new and desire to secure by Letters Patent is:

1. Opposed die blocks for die forging percussion drill bits each adapted to be secured to the hammer or anvil of a drop hammer and each having an open sided, open ended cavity formed therein and provided opposite the open side of said cavity with a centrally located fuller extending longitudinally from an intermediate point adjacent one end of said block and tapering to a vanishing point toward the other end of said block; each such block having lateral walls projecting beyond said fuller with the cavity bounding faces thereof extending in parallel relation substantially throughout the length of the block and converging at their bases toward said fuller.

2. A pair of opposed dies for forging cable tool drill bits each comprising a die block having a die cavity extending from end to end thereof and open along one side and provided within said cavity and opposite the open side thereof with a longitudinally extending fuller tapering toward one end of the block to a vanishing point; each said block being provided with longitudinally extending lateral walls with the cavity bounding faces thereof arranged in opposed parallel pairs converging in the direction of the base of the block and toward said fuller.

3. A method of forming a percussion drill bit, which includes the steps of heating to a hotworking temperature a blank having a shank forming portion and a blade forming portion of substantially greater cross-sectional area and substantially less length than the blade portion, of the bit to be finished therefrom, die forging the blade portion of the blank to substantially finished dimensions in a single pair of dies by subjecting substantial length portions of said blade forming portion to die-forging operations successively applied along the length thereof from a point intermediate the ends of the blank and adjacent the shank forming portion thereof and toward the opposite end thereof while preventing free lateral spread of such blank portion by the formation thereon of flash at diametrically opposite sides and along the medial line thereof and while permitting the metal of the portion of the blank so acted upon to flow toward the end of the blank opposite the shank portion thereof and in an amount sufficient to fill out the blade length of the bit, then removing said flash and trimming said blank to finished dimensions.

4. A method of making a drill bit of great weight which includes the steps of heating to a hot-working temperature a blank having a blade forming portion of substantially greater cross-sectional area than that of the blade of the bit to be formed therefrom, subjecting such portion of such blank, while hot, to deforming forces successively applied in overlapping relation from a point intermediate the ends of the blank and toward the blade forming end thereof while resisting free lateral spread of such portion of the blank by the formation of diametrically opposed flash along the medial line thereof and while permitting the free extrusion of the metal of the blade forming portion of the blank in the direction of the application of said deforming forces.

5. A method of making a well-drilling bit of great weight which includes the steps of heating to a hot working temperature a blank having a blade-forming portion of materially greater cross-sectional area and of substantially less length than the bit blade to be formed therefrom, subjecting such portion of said blank, while hot, to deforming forces applied thereto in successive overlapping steps from a point intermediate the ends of the blank toward the cutting end thereof and so applied that each step in the application of such forces involves a substantial length of such portion of said blank, promotes longitudinal flow of the metal thereof, and resists lateral spread of such metal and all under conditions such that substantially each step in the application of such forces that completes a reduction of one portion of the blank prepares an adjacent portion nearer the cutting edge thereof for the next step in the application thereto of such forces.

6. A method of making a well drilling bit of great weight and of the percussion type having longitudinally extending water courses in opposite sides thereof, which includes the steps of heating a blank having a blade-forming portion approximately rectangular in cross section and of materially greater cross-sectional area and of materially less length than the bit blade to be formed therefrom, die forging such blade-forming portion, while hot, to substantially finished dimensions in a single pair of dies by subjecting such portion to a plurality of die forging operations applied along the major sectional axis thereof in successive overlapping steps from a point intermediate the ends of the blank toward the cutting end thereof and so applied as to promote longitudinal flow of the metal while substantially the entire metal spreading effect to which the blank is subjected during the reduction and the formation of the water courses therein, is resisted and is limited by the formation of flash on diametrically opposite sides thereof and along the medial line thereof and all under conditions such that substantially each step of such operations that completes the reduction of one portion of the blank prepares an adjacent portion nearer the cutting edge thereof for the next step of such die forging operations.

7. A method of making a well drilling bit of the percussion type having longitudinally extending water courses on opposite sides thereof, which includes the steps of forming a blank having a shank portion and a blade portion of oblong cross-section and of materially greater cross-sectional area and less length than the bit blade to be formed therefrom, subjecting such blade-forming portion, while hot, to deforming forces applied along the major sectional axis thereof and in successive overlapping steps from a point intermediate the ends of the blank toward the cutting end of the blade to be formed therefrom and so applied as to form the water courses in the narrower longitudinally extending faces thereof, and so that each such application of such forces involves a substantial length of such portion of the blank, promotes longitudinal flow of the metal thereof while substantially the entire metal spreading effect to which such portion of the blank is subjected during the reduction in cross-sectional area thereof and the formation of the water courses therein, is resisted by the application of such forces in the formation of the walls of such courses and is limited by the formation of flash at diametrically opposite sides and along the medial line of such portion of the blank and all under conditions such that substantially each step in the application of such forces that completes the reduction of one portion of the blank prepares another portion of substantial length and nearer the cutting end thereof for the next step in the application thereto of such forces.

8. A method of making a well drilling bit of the percussion type having longitudinally extending water courses in opposite sides thereof, which includes the steps of forming a blank having a shank-forming portion and a blade-forming portion oblong in cross-section and of approximately one-third greater cross-sectional area and materially less length than the bit blade to be formed therefrom, die forging such blade-forming portion of the blank, while hot, to substantially finished dimensions in a single pair of dies by subjecting such portion to a plurality of die-forging operations applied along the major sectional axis thereof in a succession of overlapping steps from a point intermediate the ends of the blank toward the cutting end thereof and so applied as to form the water courses in the narrower longitudinally extending faces thereof and as to promote longitudinal flow of the metal acted upon while substantially the entire metal spreading effect to which such blade-forming portion of the blank is subjected during the reduction in cross-sectional area thereof and the formation of the water courses therein, is opposed by the forces applied in the formation of the walls of such water courses and the formation of flash at diametrically opposite sides and along the medial line of such portion of said blank and all under conditions such that substantially each step of such operations that completes the reduction of one portion of the blank prepares an adjacent portion nearer the cutting edge thereof for the next step of such die-forging operations.

FERDINAND J. SPANG.